United States Patent [19]

Hasuo et al.

[11] 4,288,825
[45] Sep. 8, 1981

[54] MAGNETIC CARD HANDLING APPARATUS

[75] Inventors: Masatoshi Hasuo, Yokohama; Jungo Tsuji, Yachiyo, both of Japan

[73] Assignee: Sony Corporation, Tokyo, Japan

[21] Appl. No.: 54,799

[22] Filed: Jul. 5, 1979

[30] Foreign Application Priority Data

Jul. 7, 1978 [JP] Japan .................................. 53-82759

[51] Int. Cl.³ ............................................ G11B 19/02
[52] U.S. Cl. ......................................... 360/88; 360/2;
360/130.2; 235/449; 235/475
[58] Field of Search .......................... 360/88, 2, 130.2;
271/274; 235/449, 450, 475, 483–484, 486

[56] References Cited

U.S. PATENT DOCUMENTS 3,787,661 1/1974 Moorman et al. ....................... 360/2
3,852,817 12/1974 Budrose ................................. 360/88
4,023,205 5/1977 Warner .............................. 360/88 X
4,126,885 11/1978 Murata .............................. 360/88 X Primary Examiner—John H. Wolff
Attorney, Agent, or Firm—Lewis H. Eslinger; Alvin Sinderbrand

[57] ABSTRACT

A magnetic card handling apparatus has a rotatable capstan and a magnetic head spaced apart a distance exceeding the thickness of a magnetic card on appropriate sides of a card running groove until the presence of a magnetic card therebetween is detected. The distance between the capstan and the magnetic head is thereupon decreased whereby the magnetic card is pinched between the magnetic head and the capstan and is driven past the magnetic head for recording/or reproduction of signals. Separate card running grooves with associated reproduce and record heads and separate card detecting apparatus may be provided for reproduction and recording to permit dubbing signals reproduced from one magnetic card onto another magnetic card.

26 Claims, 10 Drawing Figures

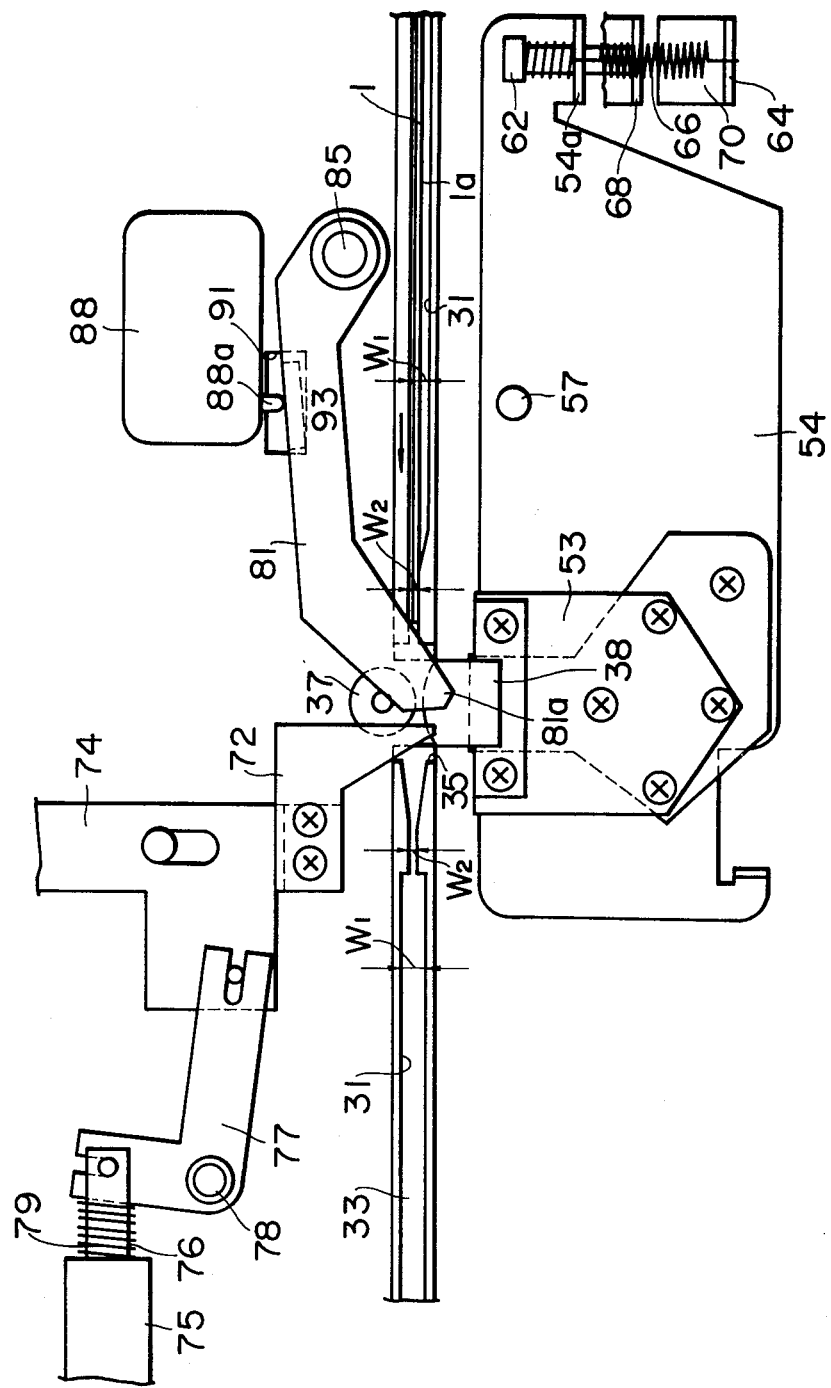

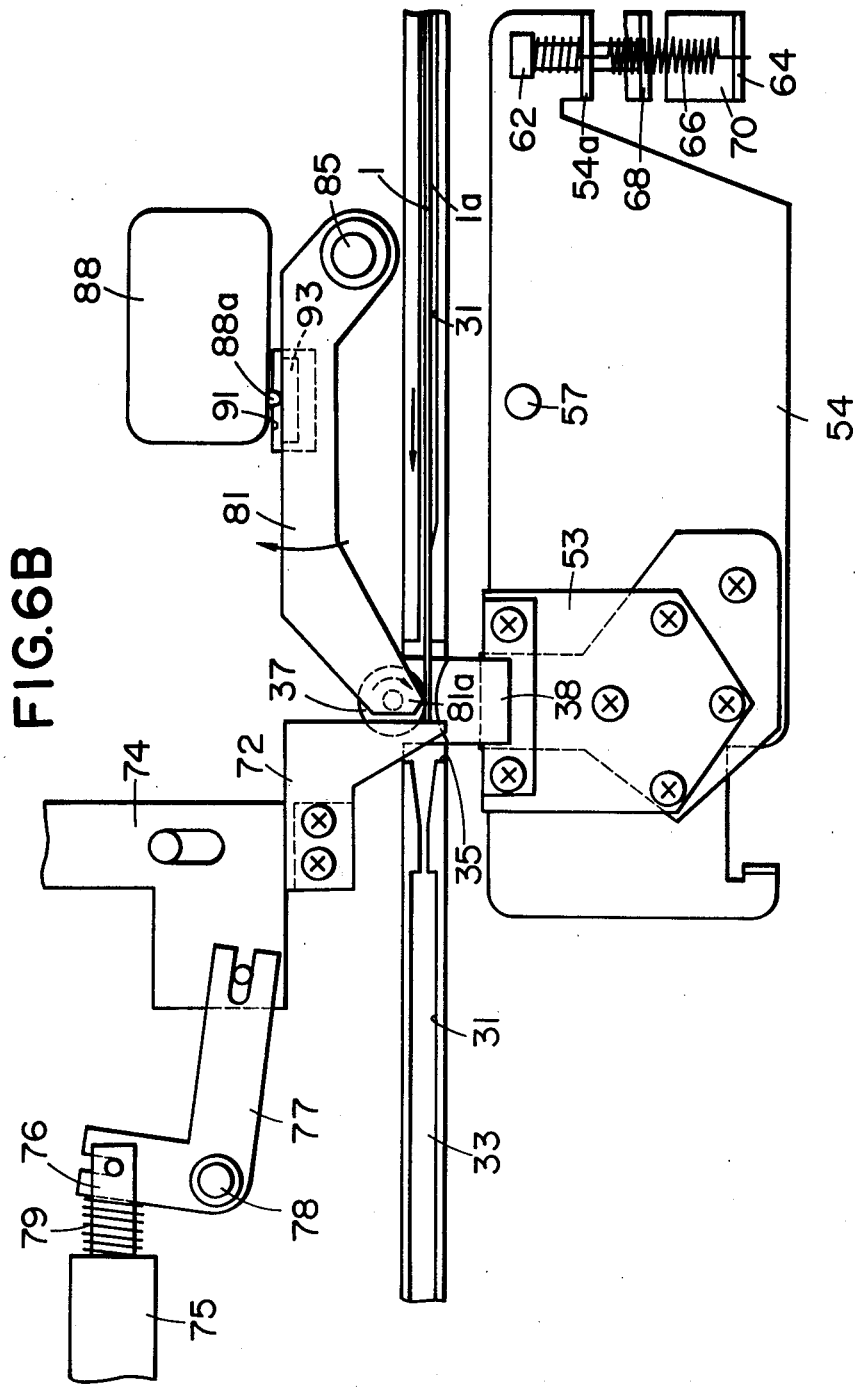

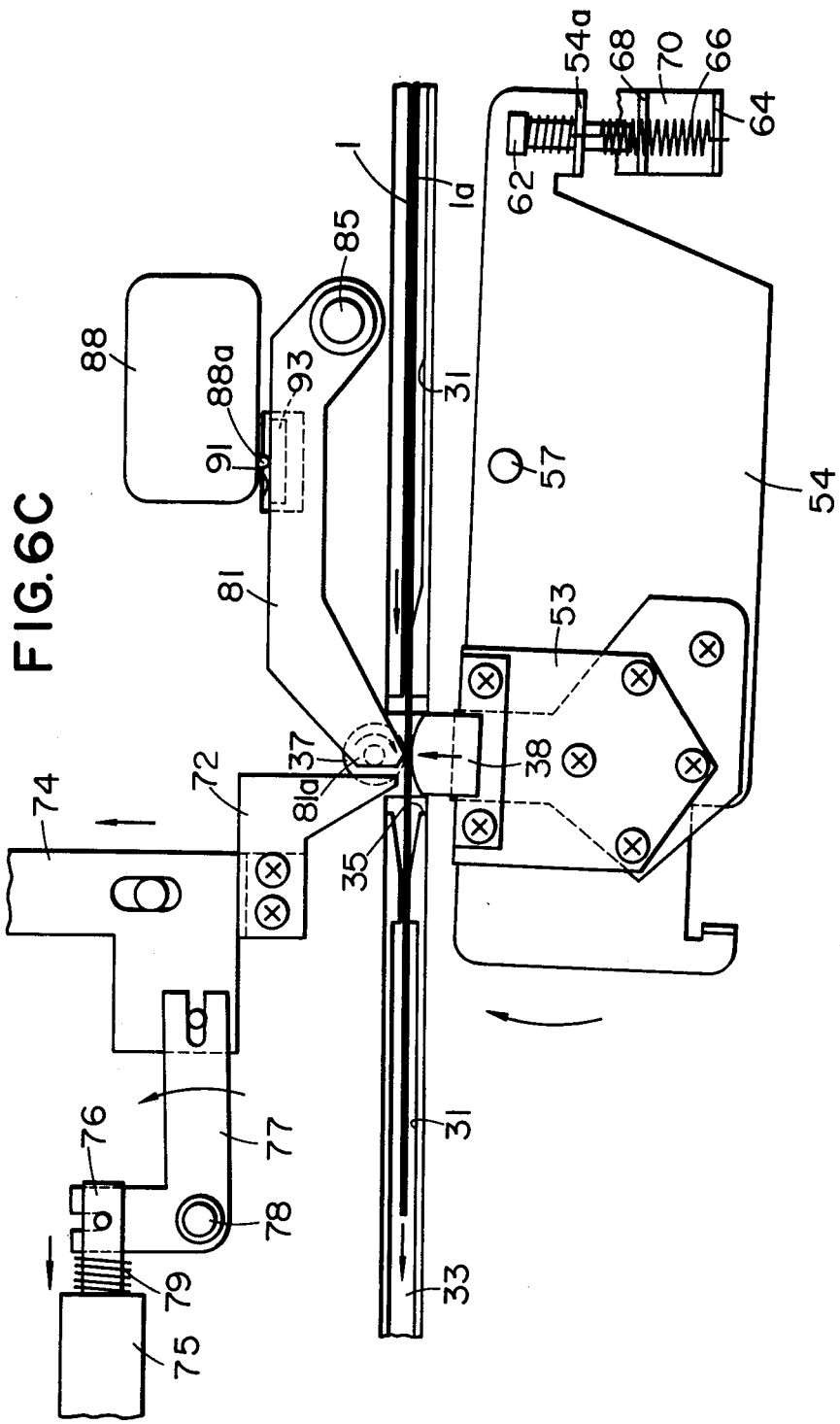

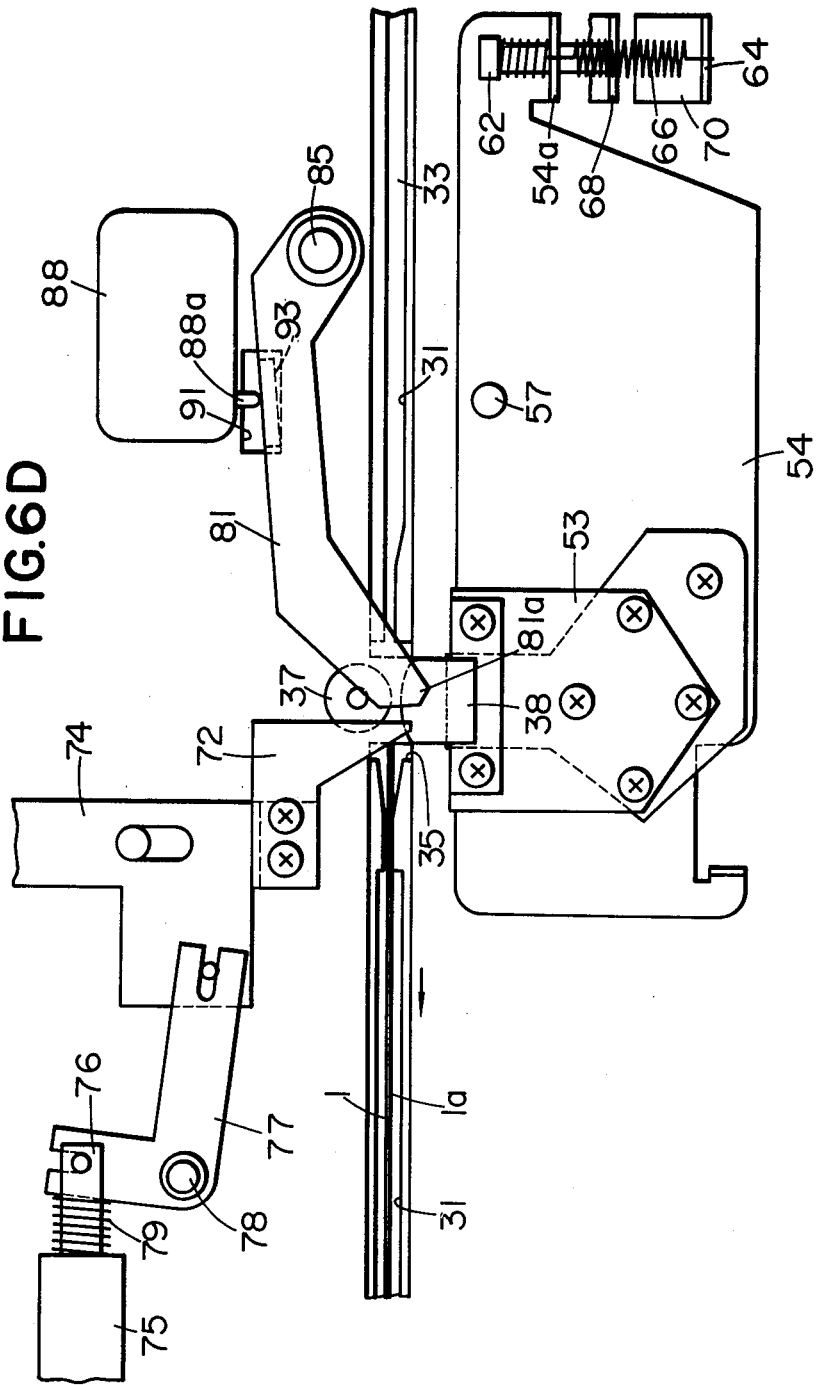

MAGNETIC CARD HANDLING APPARATUS

BACKGROUND OF THE INVENTION

This invention relates to a magnetic card handling apparatus, and more particularly, to a magnetic card handling apparatus in which a magnetic card, inserted in a card running groove, is pinched between a capstan and a magnetic head, and driven by the capstan, to run the magnetic card in the card running groove for reproducing audio signals therefrom or for recording audio signals thereon.

A card recorder using a magnetic card may be used as a language teaching aid or for other purposes. A magnetic card consists of a cardboard card which has a magnetic tape attached parallel to an edge thereof on which words or phrases of a language being studied or other material may be recorded. Pictures, letters and other illustrative material representing the recorded content may be printed on the magnetic card. One type of magnetic card is called a "master card" from which pre-recorded audio signals may be reproduced by inserting it into a card running groove in the card recorder adapted for reproduction of audio signals. Another type of magnetic card is called a "slave card" having a blank magnetic tape on which desired audio signals may be recorded by a user. The slave card is preferably unprinted to provide a surface upon which pictures and letters may be marked by the user.

In conventional magnetic card recorders, a magnetic card is pinched between a rubber-coated capstan and a magnetic head located apart a fixed distance slightly less than the thickness of the magnetic card in the card running groove. The magnetic card is preferably inserted sideways between the capstan and the magnetic head, but it may be forced downward therebetween, whereby a corner, edge or the surface of the magnetic head may be damaged. When the magnetic card is properly inserted, it is difficult to establish a predetermined start position for the magnetic card. When recording of the magnetic card is attempted before the magnetic head reaches the beginning of the magnetic tape, some matter may be lost before the magnetic tape reaches the record head. When recording does not begin at the beginning of the magnetic tape, a length of unrecorded magnetic tape has passed uselessly beyond the record head before recording begins. It is also difficult to maintain the starting point of the magnetic tape constant for reproduction. Thus, the beginning of the recorded content may be missed.

OBJECTS AND SUMMARY OF THE INVENTION

An object of this invention is to provide a magnetic card handling apparatus which overcomes the defects of a conventional card recorder.

Another object of this invention is to provide a magnetic card handling apparatus which avoids damaging magnetic cards and magnetic heads.

A further object of this invention is to provide a magnetic card handling apparatus in which an accurate starting position of the magnetic card is established.

A still further object of this invention is to provide a magnetic card handling apparatus in which the magnetic card can be stably run.

A still further object of this invention is to provide a magnetic handling apparatus in which a battery may be used as a power source.

A still further object of this invention is to provide a magnetic card handling apparatus in which audio signals can be reproduced or recorded with high fidelity.

A still further object of this invention is to provide a magnetic card handling apparatus which can be remote-controlled.

A still further object of this invention is to provide a magnetic card handling apparatus in which card-to-card dubbing can be performed.

A still further object of this invention is to provide a magnetic card handling apparatus in which the miserasion of a recorded magnetic card can be prevented.

A still further object of this invention is to provide a magnetic card handling apparatus which makes good use of space.

A still further object of this invention is to provide a magnetic card handling apparatus which is capable of accurate dubbing.

According to an aspect of the invention, there is provided a magnetic card handling apparatus for handling a magnetic card having a magnetic tape or stripe extending parallel to an edge of the card, comprising at least one card running groove for receiving the edge of the magnetic card, a magnetic head adjacent one side of the card running groove so as to be in transducing relation to the magnetic tape or stripe on a card received in said groove, a rotatable capstan adjacent the other side of the card running groove opposed to the magnetic head, means for spacing the magnetic head and the rotatable capstan apart a first distance exceeding the thickness of the magnetic card, detecting means for detecting the presence of the magnetic card between the magnetic head and the rotatable capstan and means responsive to the detecting means for decreasing the distance between the magnetic head and the rotatable capstan to a second distance smaller than the first distance whereby the magnetic card is pinched between the magnetic head and the rotatable capstan.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 6A is an enlarged plan view of a part of the apparatus of FIG. 2 shown at the beginning of insertion of a magnetic card;

FIG. 6B is a view similar to that of FIG. 6A, but in which a magnetic card has been moved into contact with a gate;

FIG. 6C is another view similar to FIG. 6A, but in which the magnetic card is being moved past the head for recording or reproducing of information thereon;

FIG. 6D is still another view similar to FIG. 6A, but in which scanning of the magnetic card has been completed.

DETAILED DESCRIPTION OF THE PREFERRED EMBODIMENTS

Figure 1:
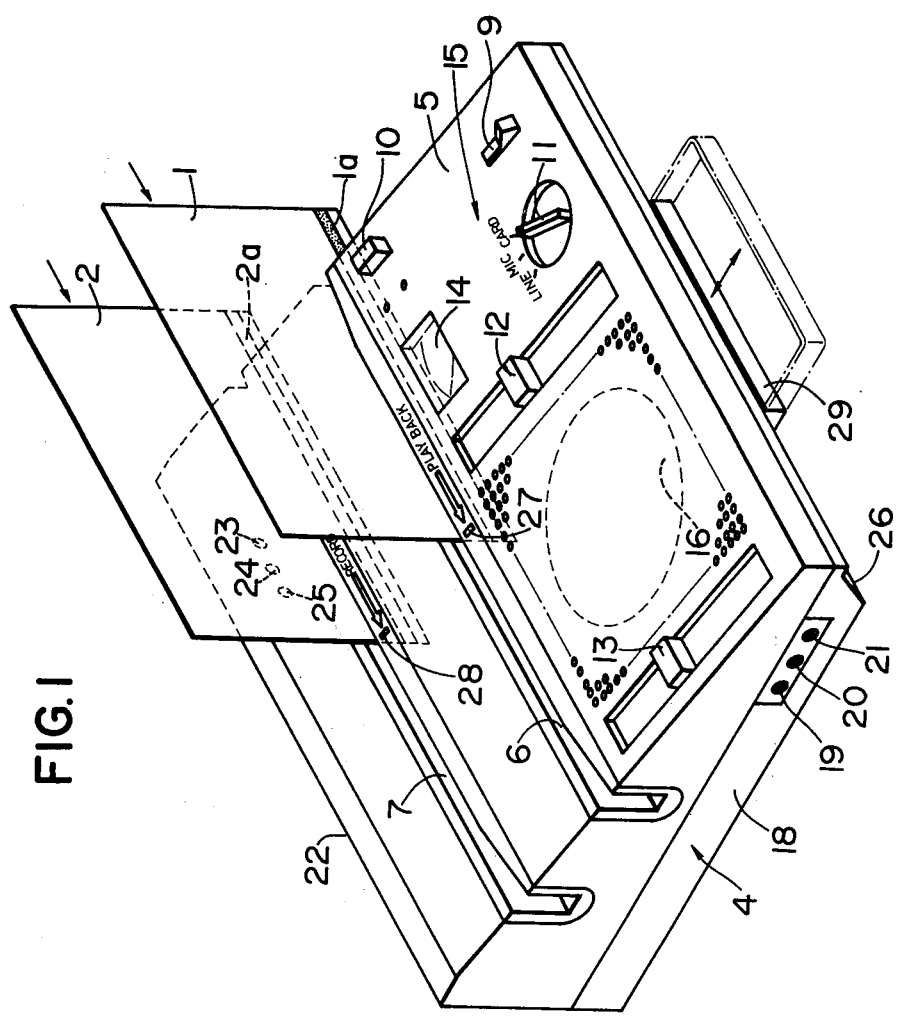
FIG. 1 is an overall perspective view of a magnetic card recording and/or reproducing apparatus with a card handling apparatus according to an embodiment of the invention.

Referring to FIG. 1, there is shown an embodiment of the invention especially adapted for portability using a battery for power. A rectangular plastic or cardboard master card 1 has a strip of magnetic tape 1a attached to one or both surfaces thereof parallel to, and spaced a predetermined distance from, its lower edge. Sound signals prerecorded on magnetic tape 1a of master card 1 may be reproduced therefrom. Indicia including, for example, letters and pictures representing the content of the recorded sound signals, may be printed on master card 1.

A rectangular plastic or cardboard slave card 2, has a strip of magnetic tape 2a attached to one or both surfaces thereof parallel to and spaced a predetermined distance from its lower edge. Magnetic tape 2a of slave card 2 is normally provided without prerecorded material thereon to permit recording of sound signals by a user. Slave card 2 is preferably provided with blank areas thereon which permits the user to mark slave card 2 as the user wishes.

An upper panel 5 of a cabinet 4 is inclined forward at a predetermined angle. A pair of parallel card running grooves 6 and 7 are disposed across upper panel 5. Front card running groove 6 is used only to reproduce sound signals from master card 1 or slave card 2. Rear card running groove 7 is used only for recording sound signals on slave card 2.

The front part of inclined upper panel 5 contains a control panel 15 which includes a power switch 9, a record-reproduce changeover switch 10, a source changeover switch 11 used to select a source of audio signals in the record mode, a slide-type record volume control 12, a slide-type reproduction volume control 13, a battery check/record level meter 14 and a loudspeaker 16. Record-reproduce changeover switch 10 is of the so-called "push-push" type which alternately selects record and reproduce functions. Sound signals from any one of a magnetic card, a microphone or a line can be selected for recording by operation of source changeover switch 11 by appropriate selection of one of its three positions, CARD, MIC or LINE. When source changeover switch 11 is placed in the CARD position, audio signals recorded on a master card 1 being run in card running groove 6 are recorded on a slave card 2 being run in card running groove 7. This mode is the so called "dubbing mode". When source changeover switch 11 is placed in the MIC position, audio signals from a microphone are recorded on a slave card 2. When source changeover switch 11 is placed in the LINE position, audio signals from a line are recorded on slave card 2. A microphone jack 19, a microphone remote control jack 20 and an earphone jack 21 are located in a side wall 18 of cabinet 4. A line input jack 23, a line output jack 24, and an auxiliary DC source jack 25 are located in a rear wall 22 of cabinet 4. A carrying handle 29 is slidably arranged in a bottom wall 26 of cabinet 4.

Master card 1 and slave card 2 are introduced into respective card running grooves 6 and 7 from the right, as shown by the arrows in FIG. 1. Cards 1 and 2 are driven leftward along grooves 6 and 7. Audio signals are recorded on slave card 2 and/or reproduced from master card 1 while running. When cards 1 and 2 are introduced into grooves 6 and 7, they are stopped at respective start positions, indicated by position marks 27 and 28 located at about the center of grooves 6 and 7, from which they are driven to run. Thus, accurate start positions for recording and reproduction are accurately determined for cards 1 and 2.

Figure 2:
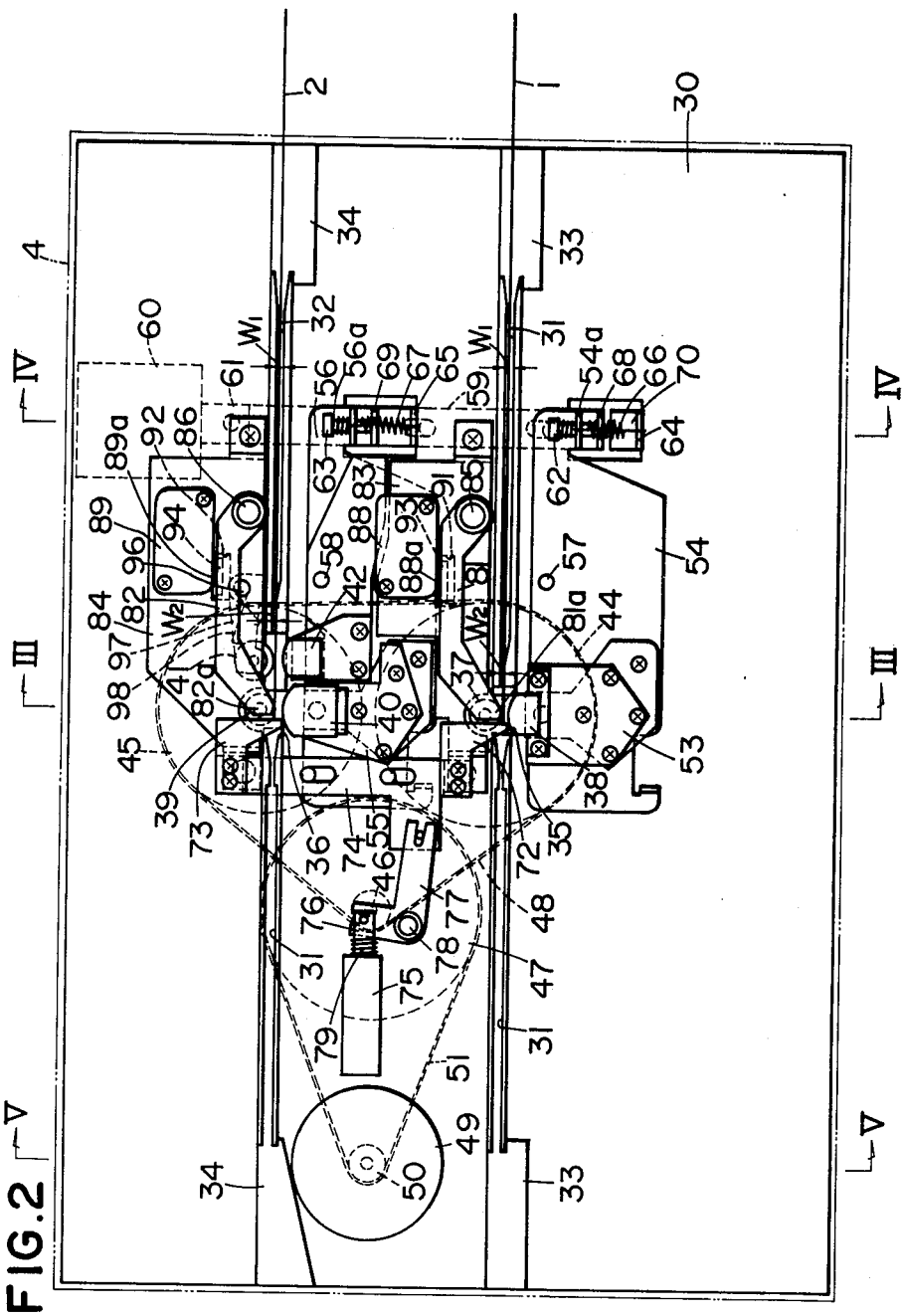
FIG. 2 is a plan view of the interior of the apparatus of FIG. 1 with the cover or cabinet removed to reveal the parts therein.
Figure 3:
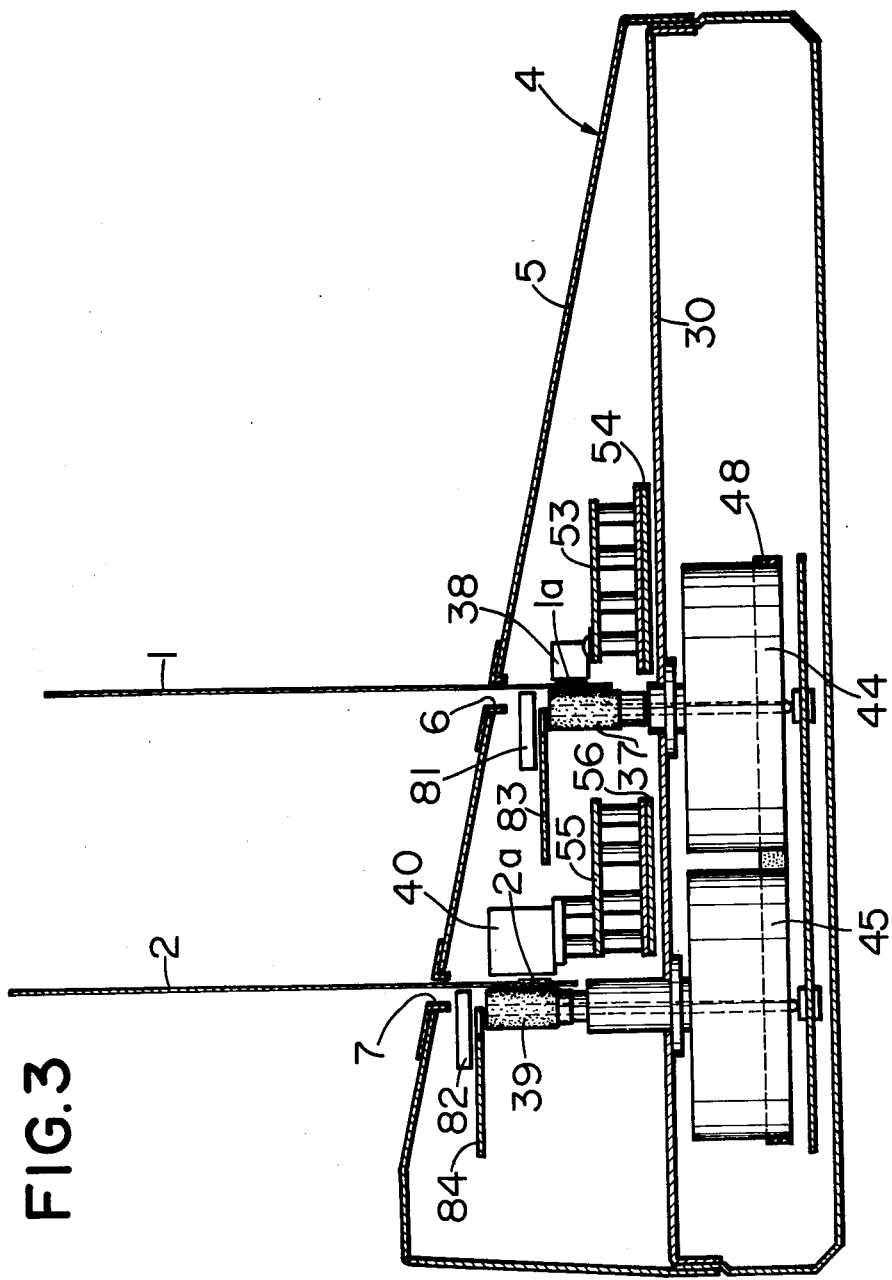
FIG. 3 is a cross-sectional view taken along the line III—III on FIG. 2.
Figure 4:
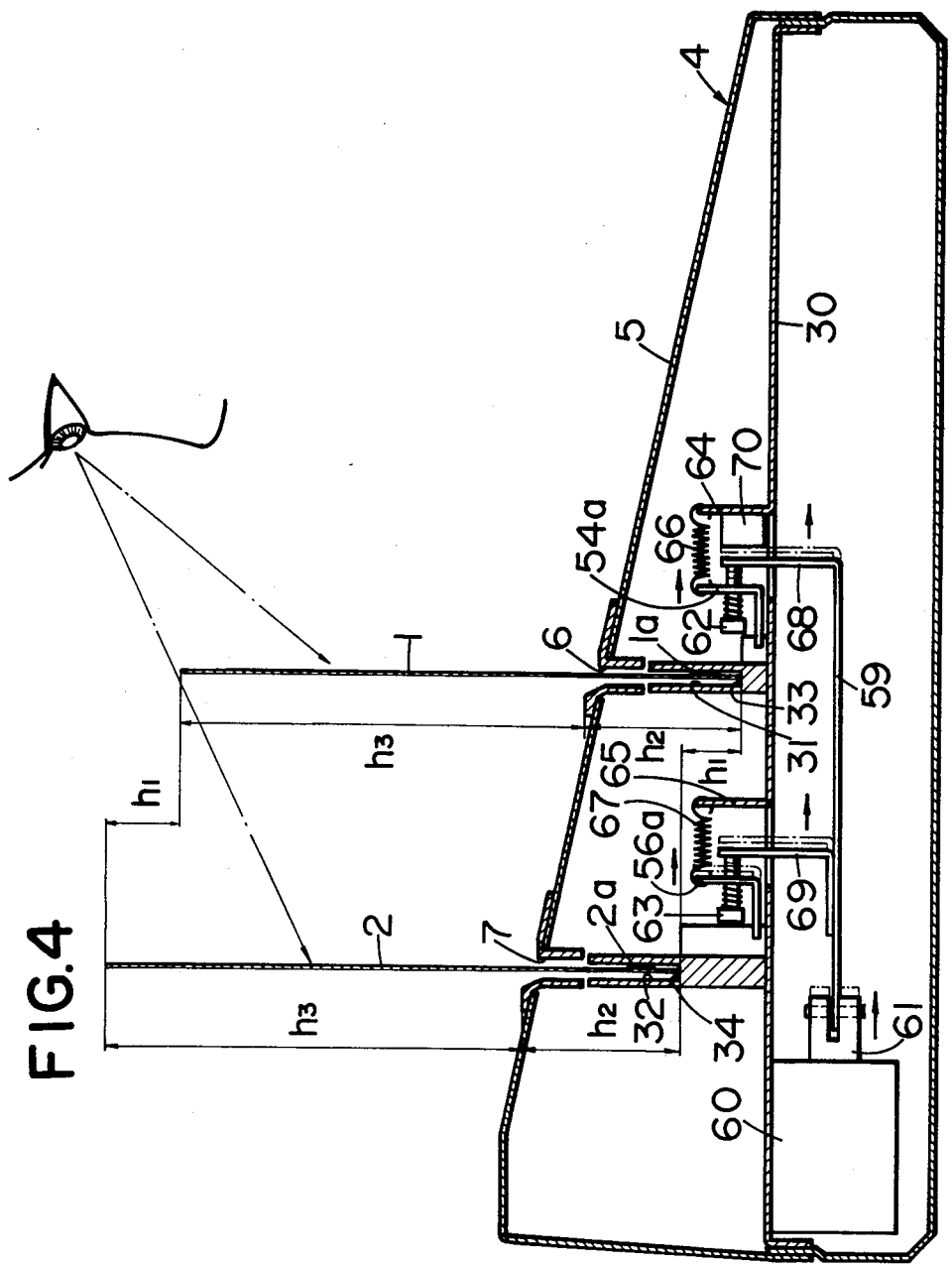
FIG. 4 is a cross-sectional view taken along the line IV—IV on FIG. 2.
Figure 5:
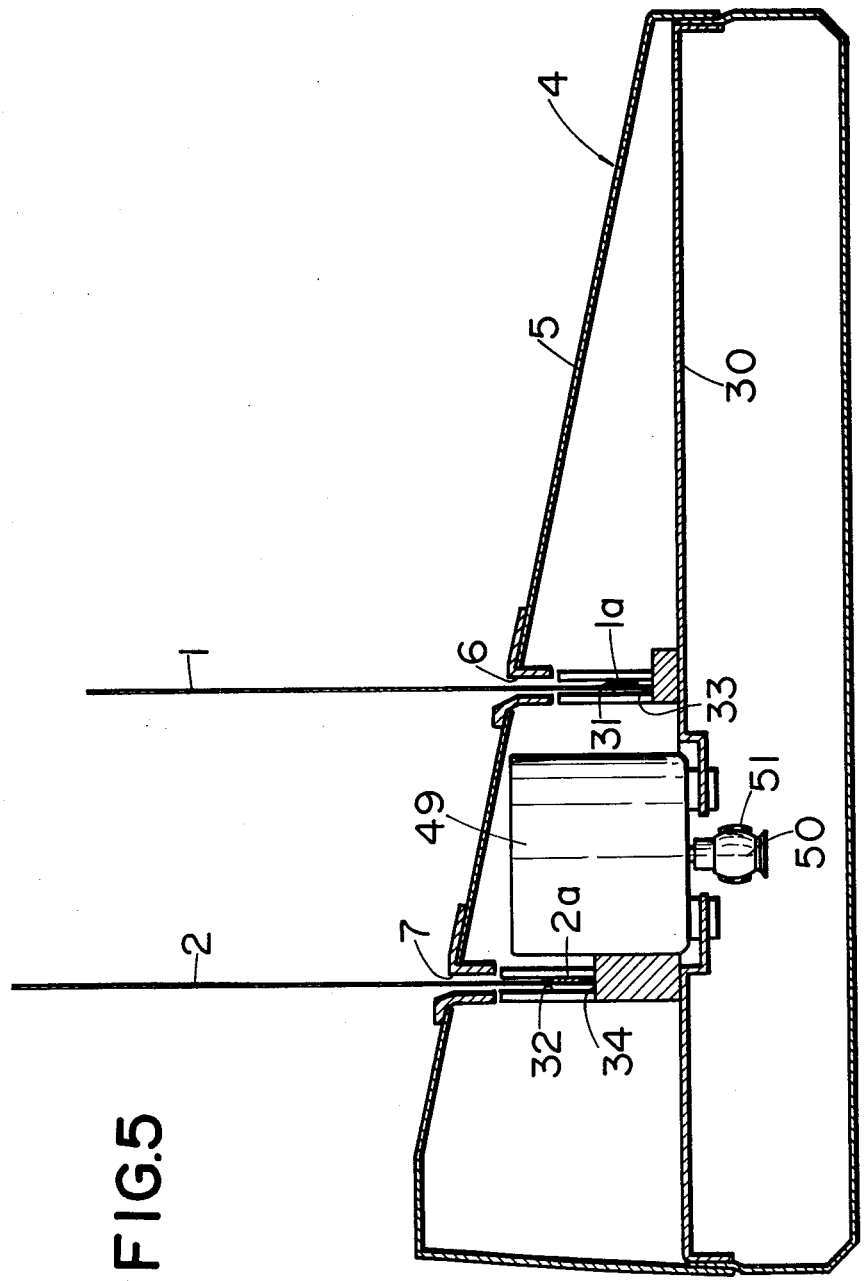
FIG. 5 is a cross-sectional view taken along the line V—V on FIG. 2.

Referring now to FIG. 2 to FIG. 6D, there is shown a card handling apparatus which includes a chassis 30 in cabinet 4. A pair of card guides 31 and 32 registering with card running grooves 6 and 7 are fixed on chassis 30. As shown in FIG. 4, chassis 30 is generally horizontal below the inclined surface of upper panel 5. Bottom surfaces 33 and 34 of card guides 31 and 32 define the lower limits of card running grooves 6 and 7 and slidably support the edges of cards 1 and 2. Bottom surface 34 of card running groove 7 is a distance $h_1$ higher than bottom surface 33 of card running groove 6 so that, in spite of the inclination of upper panel 5, cards 2 and 1 protrude about the same distance $h_2$ into their respective card running grooves. Slave card 2 therefore stands a distance $h_1$ higher than master card 1. If a prerecorded master card 1 or slave card 2 is unintentionally inserted into card running groove 7 during recording or dubbing mode, audio signals prerecorded on magnetic tape 1a of master card 1 or slave card 2 would be erased by an erase head 42. The height difference $h_1$ between card running grooves 6 and 7, as clearly shown in FIGS. 3 and 4 and the equal depths $h_2$ of card running grooves 6 and 7 permit the user to see master card 1 or slave card 2 in card running groove 7 over the top of master card 1 in groove 6. Thus, the possibility for miserasion of the card in card running groove 7 can be observed and prevented. This is aided by the readily apparent difference in appearance of master card 1 and unprinted slave card 2.

An electric motor 49 is disposed above horizontal chassis 30 between card guides 31 and 32 with its motor shaft 50 projecting downward through horizontal chassis 30. Electric motor 49 occupies the vertical space between horizontal chassis 30 and upper panel 5.

Instead of being made horizontal, as shown in FIGS. 3 and 4, horizontal chassis 30 could alternatively be formed in a generally z-shape to produce the height difference $h_1$ between card running grooves 6 and 7. To do so, however, would increase the manufacturing cost and decrease the efficient use of space. Instead, the present invention uses a simple horizontal chassis 30 and produces the desired height difference $h_1$ by elevating the bottom surface 34 of card running guide 32 a distance $h_1$. Thus, chassis 30 is easily manufactured at low cost. The placement of electric motor 49 in the upper space between chassis 30 (FIG. 5) and upper panel 5 gives effective utilization of available space.

Cutout portions 35 and 36 are located at about the centers of card guides 31 and 32. As best shown in FIG. 3, a capstan 37 and an opposed reproducing head 38 are located on opposite sides of the center line of card running groove 6, in cutout portion 35. A capstan 39 and an opposed record head 40, and a guide roller 41 and the opposed erasing head 42 (FIG. 2) are located on opposite sides of the center line of card running groove 7, in cutout portion 36.

Capstans 37 and 39 are vertically and rotatably supported on chassis 30. Fly wheels 44 and 45 (FIGS. 2 and 3) are fixed to the lower ends of capstans 37 and 39 respectively. A speed reducing fly wheel 47 is fixed on a speed reducing shaft 46 which is rotatably supported on chassis 30 at a location selected so that an equilateral triangle is formed by lines connecting the axes of capstans 37 and 39 and shaft 46. A belt 48 is wound on speed reducing shaft 46 and fly wheels 44 and 45. Another belt 51 is wound on motor shaft 50 of electric motor 49, and speed reducing fly wheel 47. Capstans 37 and 39 are driven in the clockwise directions (FIG. 2) by motor shaft 50, belt 51, speed reducing fly wheel 47, belt 48, and fly wheels 44 and 45. Capstans 37 and 39 each have a rubber surface to thus form rubber rollers.

Reproducing head 38 is mounted on a level adjusting plate 53 attached to a head chassis 54. Record head 40 and erasing head 42 are mounted on a level adjusting plate 55 attached to second head chassis 56. Head chassis 54 and 56 are rotatably supported on support shafts 57 and 58 affixed to horizontal chassis 30. At one side 54a and 56a of head chassis 54 and 56, a slide 59 is slidably arranged below chassis 30. One end of slide 59 is connected to an armature 61 of a solenoid 60 fixed below chassis 30. Adjusting screws 62 and 63 are mounted on ends 54a and 56a of head chassis 54 and 56. Head pressing springs 66 and 67 extend between ends 54a and 56a of head chassis 54 and 56, and anchors 64 and 65 bent upward from chassis 30. Adjusting screws 62 and 63 are urged toward contact members 68 and 69 fixed on slide 59 by head pressing springs 66 and 67. When slide 59 is moved by solenoid 60, head chassis 54 and 56 are rotated in the clockwise or counterclockwise direction (FIG. 2) around support pins 57 and 58. The rightward movement of slide 59 (FIG. 4) and the clockwise rotation of head chassis 54 and 56 (FIG. 2) are limited by a stop 70 on chassis 30. Clockwise rotation of head chassis 54 and 56 (FIG. 2) moves heads 38 and 40 toward capstans 37 and 39 and counterclockwise rotation thereof moves them away from capstans 37 and 39. In the counterclockwise rotated position, heads 38 and 40 are separated from capstans 37 and 39 by clearances which are substantially more than the thickness of cards 1 and 2. Thus, cards 1 and 2 can be placed in position without bending or damaging them. In the clockwise rotated position, heads 38 and 40 are separated from capstans 37 and 39 by clearances which are smaller than the thicknesses of magnetic cards 1 and 2. The clearances are adjusted by adjusting screws 66 and 67.

A pair of gates 72 and 73 for regulating the start positions of master card 1 and slave card 2 are positioned across card running grooves 6 and 7 in cutout portions 35 and 36 to the left (FIG. 2) of the centers of capstans 37 and 39. Gates 72 and 73 are fixed to respective ends of a slide 74 which is slidably mounted on chassis 30. A gate drive solenoid 75 is arranged on chassis 30 to the left of slide 74. An armature 76 of solenoid 75 is connected through a transmission link 77 to slide 74. Transmission link 77 is rotatably supported by a support pin 78 affixed to chassis 30. Armature 76 is urged in the rightward direction (FIG. 2) by a restoring spring 79. Accordingly, slide 74 is urged in the downward direction (FIG. 2) by restoring spring 79.

Armatures 61 and 76 of solenoids 60 and 75 are of the magnetic self-holding type, which are moved from one position to another by pulse-type electrical trigger signals, but remain in the selected position without requiring additional electrical signals. Armatures 61 and 76 are maintained in the retracted position by permanent magnets and are maintained in the extended position by springs (not shown). When electrically moved to the retracted position against the spring force, the magnetic attraction of the permanent magnets hold armatures 61 and 76 in their respective retracted positions after the electrical signals are removed. When electrically moved into their extended positions, the magnetic hold is broken and armatures are moved outward and held in the extended position by the respective springs after the removal of the electrical signal which initiated the action. Thus, the power consumed in driving the armatures is very small and no power is consumed in holding them in their selected positions.

A pair of card detecting levers 81 and 82 for detecting the presence of master card 1 and slave card 2 respectively are extended with their ends 81a and 82a generally diagonally across cutout portions 35 and 36 of card running guides 31 and 32. Card detecting levers 81 and 82 are rotatably supported by support pins 85 and 86 fixed on support plates 83 and 84. Ends 81a and 82a of card detecting levers 81 and 82 intersect card guides 31 and 32 (FIG. 2) in cutout portions 35 and 36 near the centers of capstans 37 and 39. Card detecting switches 88 and 89 are mounted on support plates 83 and 84 adjacent to card detecting levers 81 and 82. Actuators 88a and 89a of card detecting switches 88 and 89 are internally spring loaded to urge card detecting levers 81 and 82 in the counterclockwise direction about support pins 85 and 86 (FIG. 2). Openings 91 and 92 in support plates 83 and 84 receive projections 93 and 94 formed on card detecting levers 81 and 82 to limit counterclockwise rotation of card detecting levers 81 and 82 by engagement of the edges of openings 91 and 92 with projections 93 and 94.

Guide roller 41 is pivoted to a support lever 97 which is rotatably supported by a support pin 96. Support lever 97 is urged in the counterclockwise direction (FIG. 2) by a spring 98 to urge the guide roller 41 toward erasing head 42.

Only one magnetic head, namely reproducing head 38, contacts master card 1, whereas two magnetic heads, namely record head 40 and erase head 42, contact slave card 2. Further, the record track or tape 2a on slave card 2 is desirably more than twice as wide as the reproduction track or tape 1a on master card 1. Thus, the contact area and resultant running drag between reproducing head 38 and master card 1 is smaller than the contact area and resultant running drag between record head 40 and slave card 2. In addition, the running drag of erase head 42 is added to the running drag of record head 40 on card 2. Accordingly, the total running drag on slave card 2 is much larger than the running load for master card 1. If the peripheral speeds of capstans 37 and 39 were selected equal to each other, slave card 2 would run slower than master card 1 due to the difference in running loads. This would waste part of the length of magnetic tape 2a.

Since a common belt 48 is used on capstans 37 and 39, and since the axis of speed reducing shaft 46 is located at the apex of the equilateral triangle defined by lines joining the axes of capstans 37 and 39 and shaft 46, the wrap angles of belt 48 around fly wheels 44 and 45 are substantially equal and the drive force of motor 49 is thus substantially equally transmitted thereto. However, by making the diameter of fly wheel 45 about 2% smaller than the diameter of fly wheel 44, the peripheral speed of capstan 39 is increased by about 2% over the speed of capstan 38. This speed difference compensates for the difference in running load on cards 1 and 2 and permits them to run at substantially the same speed.

Alternatively, the peripheral speed of capstan 39 may be increased over that of capstan 37 by using capstans 39 and 37 having different diameters and fly wheels 44 and 45 having the same diameter.

Cards 1 and 2 may become curved or warped. Curve and warp adversely affect the smoothness of card running and the resulting reproduction or recording. In particular, curve and warp can produce "wow-flutter" in the recorded and reproduced audio and can vary the contact between magnetic tapes 1a and 2a, and magnetic heads 38, 40 and 42. As a result, reproduction or record fidelity is degraded. Wow-flutter is a particular problem during dubbing since the wow-flutter from recording is added to the wow-flutter from reproduction.

To reduce wow-flutter, width $W_1$ (FIGS. 6A–6D) of card running grooves 6 and 7 is reduced to width $W_2$ for a short distance on each side of the associated capstans and magnetic heads. Any curve and warp of cards 1 and 2 are effectively flattened and straightened in the reduced width $W_2$ in the region of the magnetic heads. Wow-flutter is thereby minimized, the cards run very stably, the contact between magnetic tapes 1a and 2a, and magnetic heads 38, 40 and 42 is improved and, as a result, the reproduction and recording fidelity are improved. Since the reduced width $W_2$ exists only for a short distance on each side of the capstan and magnetic head and wider width $W_1$ is used elsewhere, the running load remains small for transporting cards 1 and 2 and a small capacity motor 49 may be used.

The apparatus of the present invention provides three modes of operation, namely a reproduce mode, a record mode and a dub mode. In the reproduce mode, information recorded on a master card 1 or slave card 2 is reproduced by running the same in card running groove 6. In the record mode, information is recorded on slave card 2 from an external source such as, for example, a microphone or a line source of audio data, by running slave card 2 in card running groove 7. In the dub mode, information reproduced from master card 1 in card running groove 6 is duplicated on slave card 2 in card running groove 7. It should be clear that information on a previously recorded slave card 2 may be dubbed onto an additional slave card 2 in the dub mode. The following paragraphs describe in detail the manner in which these modes are accomplished.

In the reproduce mode, power switch 9 is turned ON, record-reproduce changeover switch 10 is placed in its reproduce position and the position of source changeover switch 11 is immaterial.

As shown in FIG. 6A, master card 1 is inserted from the right into card running groove 6 and slid toward gate 72. Just before master card 1 reaches gate 72, end 81a of card detecting laser 81 is pushed by master card 1 (FIG. 6B) thus rotating card detecting lever 81 in the clockwise direction and pushing actuator 88a of card detecting switch 88. Card detecting switch 88 is turned ON and immediately energizes electric motor 49. Electric motor 49 begins bringing capstan 37 up to speed. Due to the wide spacing between capstan 37 and reproduce head 38, no more than negligible force is applied to master card 1 by these elements. Instead, master card 1 remains momentarily positioned between capstan 37 and reproduce head 38 against gate 72.

After a predetermined delay long enough for electric motor 49 to increase the speed of capstan 37 to a predetermined value, suitably about 0.8 seconds, an electrical trigger signal is applied to gate drive solenoid 75. Armature 76 is pulled in against spring 79 and is magnetically latched in the retracted position. Slide 74 is moved upward (FIG. 2) by transmission link 77 thus withdrawing gate 72 from its blocking position across card running groove 6. After an additional predetermined delay, long enough to permit completion of the motion of gate 72, suitably about 0.3 seconds, an electrical trigger signal is applied to head pressing solenoid 60 to release armature 61 from its magnetically latched condition and to permit it to move to its fully extended position under urging of its internal spring (not shown). Accordingly, slide 59 is moved rightward (FIG. 4) into contact with stop 70. Head chassis 54 is urged in the clockwise direction (FIG. 2) by head pressing spring 66. Reproducing head 38 is thus resiliently urged into contact with magnetic tape 1a of master card 1 (FIG. 6C) by head pressing spring 66. Master card 1 is elastically pinched between rotating capstan 37 and reproducing head 38, and is transported leftward past reproduce head 38 at a constant speed. During running, audio signals previously recorded on magnetic tape 1a are reproduced from master card 1.

As shown in FIG. 6D, when the trailing end of master card 1 moves leftward beyond capstan 37 and reproducing head 38, card transport by capstan 37 stops and master card 1 stops. Just as the trailing end of master card 1 passes capstan 37, card detecting lever 81 is released and is moved back to its original position diagonally across card guide 31 by the urging of a spring (not shown) in card detecting switch 88 acting through actuator 88a. Card detecting switch 88 is turned OFF to deenergize electric motor 49. Electric trigger signals are applied to gate drive solenoid 75 and to head-pressing solenoid 60 to extend armature 76 and to retract armature 61. Gate 72 is again moved into its position blocking card running groove 6 and reproduce head 38 is moved away from capstan 37.

In the reproduce mode, card detecting switch 89 associated with card running groove 7 is inoperative. Even if a master card 1 or slave card 2 is inserted in card running groove 7 and thereby actuates card detecting switch 89, the apparatus is not energized until a card is properly placed in card running groove 6.

It should be clear that although the preferred embodiment employs electric motor 49 which is energized only in the detected presence of a magnetic card, it is equally within the scope of the present invention to use a continuously running electric motor.

In the record mode, power switch 9 is ON, record-reproduce changeover switch 10 is placed in the record position and source changeover switch 11 is placed in a position appropriate for the source from which the sound is to be recorded, for example, the MIC or the LINE position.

In a manner similar to that described above for the reproduce mode, slave card 2 is inserted into card running groove 7 against gate 73, thus actuating card detecting switch 89 which initiates energization of electric motor 49 and the time actuation of solenoids 75 and 60. Slave card 2 is transported at constant speed along card running groove 7 in contact with record head 40 and erase head 42 while audio signals from the microphone or the line are recorded on slave card 2 by record head 40. Any material previously recorded on slave card 2 is erased by erase head 42.

After being recorded, the material on slave card 2 may be reproduced by running the same in card running groove 6 in order to determine that the audio was satisfactorily recorded. For this purpose, card detecting switch 88 in card running groove 6 remains effective in the record mode to initiate card transport when a magnetic card 1 or 2 is properly inserted in card running groove 6.

In the dub mode, power switch 9 is ON, record-reproduce changeover switch 10 is placed in the record position and source changeover switch 11 is placed in the CARD position. Master card 1 or a prerecorded slave card 2 is inserted from the right into card running groove 6 until its end contacts gate 72. Similarly, slave card 2 is inserted from the right into card running groove 7 until its end contacts gate 73. Energization is not begun until both cards 1 and 2 are in position. Thus the order of inserting cards 1 and 2 into card running grooves 6 and 7 is not important.

When both master card 1 and slave card 2 are located at their respective start positions, aligned with each other, this condition is detected by card detecting levers 81 and 82. Card detecting switches 88 and 89 are both turned ON and motor 49 starts to bring capstans 37 and 39 up to running speed. After appropriate delays, gate drive solenoid 75 is actuated to open gates 72 and 73 and head pressing solenoid 60 is actuated to rotate head chassis 54 and 56 in the clockwise direction (FIG. 2) thus bringing reproduce head 38 into contact with magnetic tape 1a of master card 1, and record head 40 and erase head 42 into contact with magnetic tape 2a of slave card 2.

Cards 1 and 2 are simultaneously transported in card running grooves 6 and 7 at constant equal speeds. Audio signals reproduced from master card 1 are recorded on slave card 2. In the manner previously described, cards 1 and 2 stop running at the end of the dubbing operation when the trailing end of either of them passes beyond its respective capstan.

Figure 7:
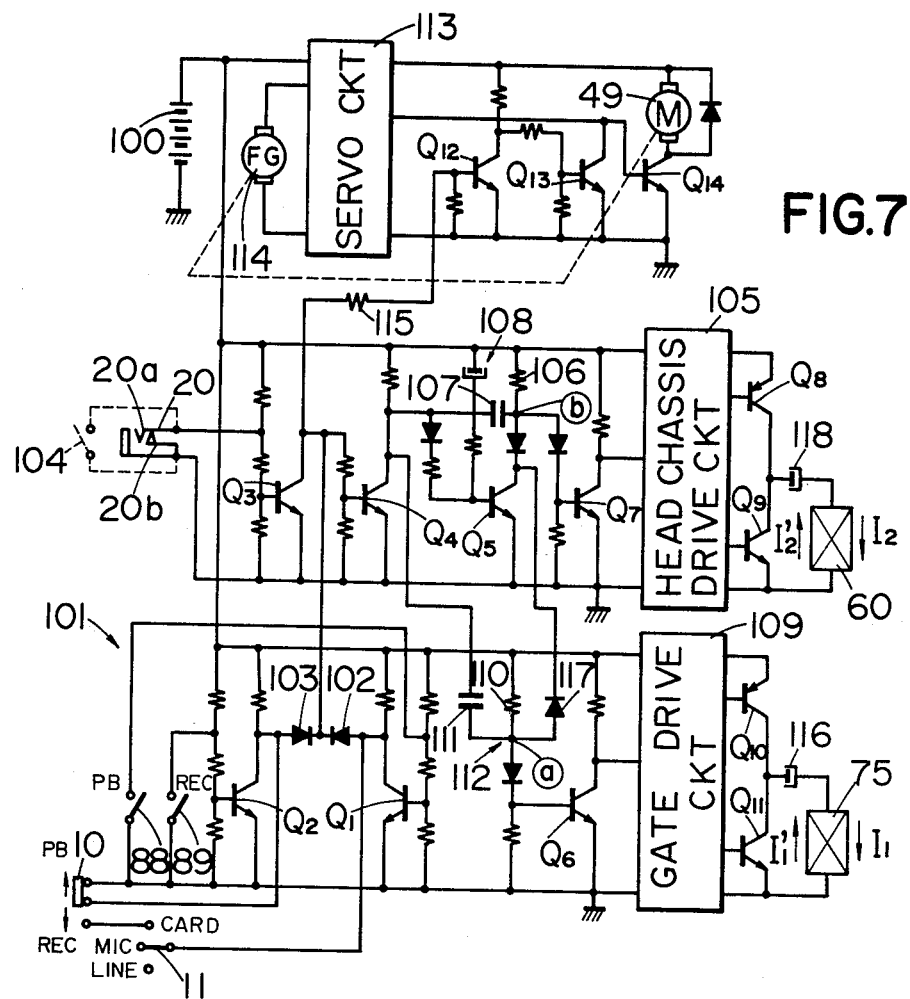
FIG. 7 is a schematic diagram of a system control circuit suitable to control the apparatus of FIG. 1.

Referring now to FIG. 7, there is shown a system control circuit for controlling the apparatus. Since the electronic circuits for recording, reproducing and erasing audio signals are well known in the art and do not form a part of the present invention, they are omitted from the description and the drawings.

A power source, such as, for example, a battery 100, suitably of DC 6 V, provides power for the system control circuit and may optionally provide power to the recording, reproducing and erasing electronic circuits (not shown). A card insertion detecting circuit 101 includes transistors $Q_1$ and $Q_2$, card detecting switches 88 and 89, record-reproduce changeover switch 10, source changeover switch 11 and diodes 102 and 103. A signal from card insertion detecting circuit 101, indicating the presence of a card, is supplied to the collector of a transistor $Q_3$ from the junction of the cathode terminals of diodes 102 and 103. Transistor $Q_3$ is a switching transistor for remote control of recording or reproduction. When no plug is inserted into jack 20, contacts 20a and 20b are connected to each other to short the base of transistor $Q_3$ to ground and thus to turn OFF transistor $Q_3$. In the initial condition, armature 76 is extended from solenoid 75, and armature 61 is retracted into solenoid 60.

Head drive transistors $Q_8$ and $Q_9$ are operated by a conventional head chassis drive circuit 105 which is driven by transistors $Q_4$, $Q_5$ and $Q_7$. A delay circuit 108, consisting of a resistor 106 and a capacitor 107 having a time constant of about 1.1 seconds for delaying actuation of solenoid 60, is connected to the collector of transistor $Q_5$.

Gate drive transistors $Q_{10}$ and $Q_{11}$ are operated by a gate drive circuit 109 which is driven by a transistor $Q_6$. A delay circuit 112, consisting of a resistor 110 and a capacitor 111 having a time constant of about 0.8 seconds for delaying actuation of gate solenoid 75, is connected to the collector of transistor $Q_5$ through a reverse-flow preventing diode 117.

Motor 49 is driven through the collector-emitter path of a transistor $Q_{14}$. The rotational speed of motor 49 is detected by a field generator 114 which provides a signal to servo circuit 113. A control voltage in accordance with a signal from field generator 114 is applied from servo circuit 113 to motor 49 to control its speed at a constant value. ON-OFF control of transistor $Q_{14}$ is effected by transistors $Q_{12}$ and $Q_{13}$ connected in cascade. Transistor $Q_{12}$ is turned ON or OFF by the card insertion detecting signal from detecting circuit 101. When transistor $Q_{12}$ is turned ON, transistor $Q_{13}$ is turned OFF, or is made non-conductive, thus permitting control signals from servo circuit 113 to be applied to the base of transistor $Q_{14}$. When transistor $Q_{12}$ is turned OFF, transistor $Q_{13}$ is turned ON, or made conductive, and effectively short circuits the base of transistor $Q_{14}$ to ground and prevents application thereto of control signals from servo circuit 113.

The following paragraphs describe the operation of the control circuit of FIG. 7 in the reproduce, record and dub modes.

In the reproduce mode, record-reproduce changeover switch 10 is moved to the reproduce position thus connecting together the upper two terminals (FIG. 7) thereof and grounding the anode terminal of diode 103. The position of source changeover switch 11 is immaterial in the reproduce mode. When master card 1 or a prerecorded slave card 2 is introduced into card running groove 6, card detecting switch 88 is closed thus short circuiting the base of transistor $Q_1$ to ground. Transistor $Q_1$ is turned OFF. The collector voltage of transistor $Q_1$ increases in the positive direction. Since contacts 20a and 20b of jack 20 are in contact with each other, transistor $Q_3$ is OFF. Accordingly, the positive collector voltage at the collector of transistor $Q_1$ is applied through diode 102 and resistor 115 to the base of transistor $Q_{12}$. Transistor $Q_{12}$ is turned ON by the positive voltage at its base and the resulting decrease in the voltage as its collector turns transistor $Q_{13}$ OFF. With the short circuit across the base-emitter junction of transistor 14 removed by turning OFF transistor 13, the control voltage from servo circuit 113 is applied to transistor $Q_{14}$ to energize and control drive motor 49 to begin bringing capstans 37 and 39 up to speed.

Transistor $Q_4$ is normally OFF and transistor $Q_5$ is normally ON and thus capacitors 107 and 111 are charged in preparation for operation initiated by closure of card detecting switch 88 or 89. The increased collector voltage of transistor $Q_1$ resulting from the closure of card detecting switch 88 is applied to the base of transistor $Q_4$ which is thereby turned ON and transistor $Q_5$ is turned OFF. Transistor $Q_4$ provides a ground reference at the junction of its collector and capacitors 107 and 111. Thus, a negative voltage appears at the other terminals of capacitors 107 and 111. The negative voltage holds transistors $Q_6$ and $Q_7$ OFF. Capacitors 107 and 111 begin charging toward the positive supply voltage through resistors 106 and 110 thus increasing the voltages at points a and b. After about 0.8 seconds, the voltage at point a is increased sufficiently to turn transistor $Q_6$ ON. Gate drive circuit 109 is energized to turn transistor $Q_{10}$ ON, and to turn transistor $Q_{11}$ OFF. The ON condition of transistor $Q_{10}$ produces a trigger current $I_1$ for about 0.1 seconds through a capacitor 116 into solenoid 75. Solenoid 75 opens gates 72 and 73.

After an additional 0.3 seconds, the voltage at point b is increased sufficiently to turn transistor $Q_7$ ON. Head chassis drive circuit 105 is energized by transistor $Q_7$ to turn ON transistor $Q_8$ and to turn OFF transistor $Q_9$. The ON condition of transistor $Q_8$ produces a trigger current $I_2$ for about 0.1 seconds through a capacitor 118 into solenoid 60. Accordingly, head chassis 54 and 56 are rotated to start reproduction by pressing reproducing head 38 to capstan 37 through the card.

When reproduction ends, the end of the card passes beyond capstan 37 and reproducing head 38. Card detecting switch 88 is opened and transistors $Q_1$ and $Q_4$–$Q_{14}$ revert to their original states. Transistor $Q_{13}$ is turned ON, and accordingly shorts the base of transistor $Q_{14}$ to ground, thus turning transistor $Q_{14}$ OFF to stop motor 49. Transistors $Q_9$ and $Q_{11}$ are turned ON and transistors $Q_8$ and $Q_{10}$ are turned OFF. The charges previously stored in capacitors 118 and 116 are discharged through solenoids 60 and 75 to produce trigger currents $I'_1$ and $I'_2$ for about 0.1 seconds in the opposite direction from trigger currents $I_1$ and $I_2$. Gates 72 and 73 and head chassis 54 and 56 are returned to their original positions.

When a card is inserted into record card running groove 7 in the reproduce mode, namely with record-reproduce changeover switch 10 in the reproduce position, card detecting switch 89 is closed. However, since the collector of transistor $Q_2$ is connected through record-reproduce changeover switch 10 to ground, transistors $Q_4$ and $Q_{12}$ remain OFF. Thus, the apparatus remains deenergized.

In the record mode, record-reproduce changeover switch 10 is placed in the record position. Source changeover switch 11 is placed in the MIC or LINE position. When slave card 2 is inserted into running groove 7, switch 89 is closed, thus shorting the base of transistor $Q_2$ to ground and turning transistor $Q_2$ OFF. The collector voltage of transistor $Q_2$ increases and is applied through diode 103 to turn ON transistors $Q_4$ and $Q_{12}$. As a result, the same sequence of operations as in the above-described reproducing mode is performed.

While slave card 2 is being transported, audio signals from the microphone or any other source are recorded on the card. When card 2 passes beyond capstan 39 and record head 40, card detecting switch 89 is opened. Transistors $Q_2$ and $Q_4$–$Q_{14}$ revert to their original states. Card 2 may be removed from card running groove 7, and inserted into card running groove 6. Card detecting switch 88 is closed to turn off transistor $Q_1$. The same operation as in the reproducing mode is effected. The content recorded on card 2 is reproduced. Thus, the recorded audio signals may be reviewed.

In the dub mode, source changeover switch 11 is placed in the CARD position, and record-reproduce changeover switch 10 is placed in the record position. The collectors of transistors $Q_1$ and $Q_2$ are directly connected to each other through the contacts of switches 10 and 11. Both of transistors $Q_1$ and $Q_2$ must be turned OFF by closure of both of card detecting switches 88 and 89 respectively by a master card 1 inserted into running groove 6 and a slave card 2 inserted into running groove 7 before an energizing signal can be applied through resistor 115 to the base of transistor $Q_{12}$. When this condition is satisfied, transistors $Q_4$ and $Q_{12}$ are turned ON. As a result, the sequence of operations described above is performed. Both cards 1 and 2 start together and are driven at the same speed in their respective card running grooves 6 and 7. Reproduced audio from reproduce head 38 is recorded by record head 40 onto slave card 2.

Remote control can be performed in any mode. In the record or dub mode using a remote control switch 104, record-reproduce changeover switch 10 is placed in the record position, and source changeover switch 11 is placed in any of its positions. A remote control plug is inserted into jack 20 thus separating contacts 20a and 20b. Transistor $Q_3$ is turned ON by the separation of contacts 20a and 20b. Slave card 2 is inserted into card running groove 7 to close card detecting switch 89 and in the dub mode, a master card 1 is also inserted into card running groove 6 to close card detecting switch 88. Transistor $Q_1$ is turned OFF. The collector voltage of transistor $Q_1$ increases but, since transistor $Q_3$ is turned On and its collector voltage remains low, transistors $Q_4$ and $Q_{12}$ remain OFF. This is the stand-by condition. When switch 104 is closed, transistor $Q_3$ is turned OFF, its collector voltage increases and this increase turns transistors $Q_4$ and $Q_{12}$ ON. Recording of audio signals can then be performed from the appropriate source. Switch 104 may conveniently be associated with a microphone. However, a remote control switch 104 not associated with a microphone may also be used. In the reproduce mode, remote control is performed in the manner described in the preceding except that only card detecting switch 88 is operative to enable operation by remote control switch 104.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic card handling apparatus for handling a magnetic card having at least an end, an edge and a thickness; comprising:
   at least one card running groove for receiving said edge of said magnetic card;
   a magnetic head adjacent one side of said groove;
   a rotatable capstan adjacent the other side of said card running groove opposed to said magnetic head;
   means for spacing said magnetic head and said rotatable capstan apart a first distance exceeding said thickness of said magnetic card;
   detecting means for detecting the presence of said magnetic card between said magnetic head and said rotatable capstan; and
   means responsive to said detecting means for decreasing the distance between said magnetic head and said rotatable capstan to a second distance smaller than said first distance whereby said magnetic card is pinched between said magnetic head and said rotatable capstan so as to be driven by the latter.

2. A magnetic card handling apparatus according to claim 1; further comprising means for longitudinally positioning said magnetic card in said groove between said rotatable capstan and said magnetic head.

3. A magnetic card handling apparatus according to claim 2; wherein said means for longitudinally positioning said magnetic card includes a gate extending across said card running groove and operative to contact said end, and means responsive to said detecting means for opening said gate.

4. A magnetic card handling apparatus according to claim 3; wherein said means for opening said gate includes a solenoid having an armature connected to said gate, said armature having first and second positions and being effective to move said gate into a position extending across said groove in said first position and to open said gate in said second position.

5. A magnetic card handling apparatus according to claim 1; wherein said means for decreasing said distance includes a support shaft, a head chassis rotatably supported on said support shaft, said magnetic head being mounted on said head chassis, a solenoid having an armature connected to said head chassis, said armature having first and second positions and being effective to position said magnetic head at said first distance in said first position and said second distance in said second position.

6. A magnetic card handling apparatus according to claim 5; further comprising means in said solenoid for maintaining said armature in either one of said first and second positions without electrical input thereto.

7. A magnetic card handling apparatus according to claim 1; further comprising an electric motor for rotating said rotatable capstan and means responsive to said detecting means for energizing said electric motor.

8. A magnetic card handling apparatus according to claim 7; further comprising delay means for delaying operation of said means for decreasing for a first predetermined time after energizing said motor, said rotatable capstan being brought up to speed in said first predetermined time.

9. A magnetic card handling apparatus according to claim 8; further comprising means for longitudinally positioning said magnetic card in said groove between said rotatable capstan and said magnetic head.

10. A magnetic card handling apparatus according to claim 9; wherein said means for longitudinally positioning said magnetic card includes a gate extending across said card running groove and operative to contact said end, and means responsive to said detecting means for opening said gate.

11. A magnetic card handling apparatus according to claim 10; further comprising other delay means for delaying opening of said gate for a second predetermined time shorter than said first predetermined time.

12. A magnetic card handling apparatus according to claim 1; wherein said card running groove has a first width and a second width, said first width being located in the vicinity of said capstan and said magnetic head and said second width being at all other parts of said card running groove, said first width being close to said thickness whereby said magnetic card may be run smoothly in contact with said magnetic head and said second width being substantially greater than said thickness whereby drag on said magnetic card is reduced.

13. A magnetic card handling apparatus according to claim 1; wherein said magnetic head is a record head.

14. A magnetic card handling apparatus according to claim 1; wherein said magnetic head is a reproduce head.

15. A magnetic card handling apparatus according to claim 1; wherein said detecting means includes switch means for supplying a card detecting signal.

16. A magnetic card handling apparatus for handling a magnetic card having at least an end, an edge and a thickness; comprising:
  at least one card running groove for receiving said edge of said magnetic card;
  a reproduce magnetic head adjacent one side of said groove;
  a rotatable capstan adjacent the other side of said card running groove opposed to said magnetic head;
  means for spacing said magnetic head and said rotatable capstan apart a first distance exceeding said thickness of said magnetic card;
  detecting means for detecting the presence of said magnetic card between said magnetic head and said rotatable capstan;
  means responsive to said detecting means for decreasing the distance between said magnetic head and said rotatable capstan to a second distance smaller than said first distance whereby said magnetic card is pinched between said magnetic head and said rotatable capstan so as to be driven by the latter;
  a second card running groove;
  a record head adjacent one side of said second card running groove;
  a second rotatable capstan adjacent the other side of said second card running groove opposed to said record head;
  second means for spacing said record head and said second rotatable capstan apart a third distance exceeding said thickness of said magnetic card;
  second detecting means for detecting the presence of said magnetic card between said record head and second rotatable capstan; and
  second means responsive to said second detecting means for decreasing the distance between said record head and said second rotatable capstan to a fourth distance smaller than said third distance whereby said magnetic card is pinched between said record head and said second rotatable capstan.

17. A magnetic card handling apparatus according to claim 16; further comprising an electric motor for rotating the first mentioned rotatable capstan and said second rotatable capstan, and means for energizing said electric motor in response to at least one of the first mentioned detecting means and said second detecting means.

18. A magnetic card handling apparatus according to claim 17; wherein said means for energizing said motor is responsive only to said first mentioned detecting means.

19. A magnetic card handling apparatus according to claim 17; wherein said means for energizing said motor is responsive to either said first mentioned detecting means or said second detecting means.

20. A magnetic card handling apparatus according to claim 17; wherein said means for energizing said motor is responsive only to both of said first mentioned detecting means and said second detecting means acting simultaneously.

21. A magnetic card handling apparatus according to claim 17; further comprising remote control means for remotely controlling said means for energizing said motor.

22. A magnetic card handling apparatus for handling a magnetic card having at least an end, an edge and a thickness; comprising:
   at least one card running groove for receiving said edge of said magnetic card;
   a reproduce magnetic head adjacent one side of said groove;
   a rotatable capstan adjacent the other side of said card running groove opposed to said magnetic head;
   means for spacing said magnetic head and said rotatable capstan apart a first distance exceeding said thickness of said magnetic card;
   detecting means for detecting the presence of said magnetic card between said magnetic head and said rotatable capstan;
   means responsive to said detecting means for decreasing the distance between said magnetic head and said rotatable capstan to a second distance smaller than said first distance whereby said magnetic card is pinched between said magnetic head and said rotatable capstan so as to be driven by the latter;
   a second card running groove;
   a record head adjacent said second card running groove; and
   a second rotatable capstan adjacent the side of said second card running groove opposite to said record head.

23. A magnetic card handling apparatus according to claim 22; wherein said second card running groove is spaced behind and parallel to said one card running groove and said second card running groove is higher than said one card running groove whereby at least part of a magnetic card in said second card running groove is visible over a magnetic card in said one card running groove.

24. A magnetic card handling apparatus according to claim 23; further comprising:
   a horizontal chassis supporting said one and second card running grooves; and
   an electric motor located between said one and second card running grooves for rotating the first mentioned capstan and said second capstan.

25. A magnetic card handling apparatus according to claim 22; including means for rotating the rotatable capstan which is adjacent one of said card running grooves at a faster peripheral speed than the other of said rotatable capstans whereby a difference in the running drag on the magnetic cards in said first and second card running grooves is compensated.

26. A magnetic card handling apparatus according to claim 22; further comprising a single electric motor for rotating the rotatable capstans adjacent said one and second card running grooves, and means for rotating one of said rotatable capstans at a faster peripheral speed than the other.

* * * * *